(12) United States Patent
Khamas et al.

(10) Patent No.: US 12,634,230 B2
(45) Date of Patent: May 19, 2026

(54) ENTERPRISE SLICING LEVERAGING SAME UPF INSTANCE

(71) Applicant: Boost SubscriberCo L.L.C., Englewood, CO (US)

(72) Inventors: Ash Khamas, Goffstown, NH (US); Kazi Bashir, Lewisville, TX (US); Mehdi Alasti, Arlington, VA (US); Amit Pathania, Great Falls, VA (US); Siddhartha Chenumolu, Ashburn, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 18/535,759

(22) Filed: Dec. 11, 2023

(65) Prior Publication Data

US 2024/0380690 A1 Nov. 14, 2024

Related U.S. Application Data

(60) Provisional application No. 63/501,092, filed on May 9, 2023.

(51) Int. Cl.
| | |
|---|---|
| *H04L 45/00* | (2022.01) |
| *H04L 45/50* | (2022.01) |
| *H04L 45/586* | (2022.01) |

(52) U.S. Cl.
CPC .............. *H04L 45/38* (2013.01); *H04L 45/50* (2013.01); *H04L 45/586* (2013.01)

(58) Field of Classification Search
CPC ........ H04L 45/38; H04L 45/50; H04L 45/586
(Continued)

(56) References Cited

U.S. PATENT DOCUMENTS

| | | | | |
|---|---|---|---|---|
| 2007/0121486 A1* | 5/2007 | Guichard | ................ | H04L 45/28 370/216 |
| 2007/0248091 A1* | 10/2007 | Khalid | ................ | H04L 63/0272 370/392 |

(Continued)

OTHER PUBLICATIONS

X. Zhou, R. Li, T. Chen and H. Zhang, "Network slicing as a service: enabling enterprises' own software-defined cellular networks," in IEEE Communications Magazine, vol. 54, No. 7, pp. 146-153, Jul. 2016, (Year: 2016).*

(Continued)

*Primary Examiner* — Taylor A Elfervig
(74) *Attorney, Agent, or Firm* — Kilpatrick Townsend & Stockton LLP

(57) ABSTRACT

Methods, devices, and systems for network slicing are provided. In one example, a method includes: selecting a first network slice and a second network slice both pertaining to a common data network, designating a first traffic flow to the first network slice and a second traffic flow to the second network slice, generating a first network slice profile including a first network identifier and first mapping information, generating a second network slice profile including a second network identifier and second mapping information, assigning the first network slice profile to the first traffic flow and the second network slice profile to the second traffic flow, and separating the first traffic flow from the second traffic flow on a user plane function (UPF) instance, based on the assigned first network slice profile and the second network slice profile.

16 Claims, 7 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 2018/0183728 A1* | 6/2018 | Kumar | .................... | G06N 20/00 |
| 2019/0045357 A1* | 2/2019 | Cooper | ................... | H04L 45/50 |
| 2019/0268973 A1* | 8/2019 | Bull | ...................... | H04W 92/02 |
| 2021/0028988 A1* | 1/2021 | Jana | ................... | H04L 41/5019 |
| 2021/0112428 A1* | 4/2021 | Young | ................... | H04W 76/11 |
| 2021/0112565 A1* | 4/2021 | Bhaskaran | .............. | H04W 8/18 |
| 2022/0174544 A1* | 6/2022 | Taft | ....................... | H04W 28/10 |
| 2022/0201601 A1* | 6/2022 | Cai | ......................... | H04W 8/20 |
| 2022/0263826 A1* | 8/2022 | Ping | ................... | H04L 41/5009 |
| 2022/0377650 A1* | 11/2022 | Kotaru | ................. | H04W 24/10 |
| 2023/0048870 A1* | 2/2023 | Mariyani | ................ | H04W 4/50 |
| 2023/0254914 A1* | 8/2023 | Williams | ............ | H04L 41/0895 |
| | | | | 370/328 |
| 2024/0022952 A1* | 1/2024 | Talebi Fard | ........ | H04W 72/543 |

OTHER PUBLICATIONS

L. M. Moreira Zorello, S. Troia, S. Giannotti, R. Alvizu, S. Bregni and G. Maier, "On the Network Slicing for Enterprise Services with Hybrid SDN," 2020 IEEE Latin-American Conference on Communications (LATINCOM), Santo Domingo, Dominican Republic, 2020, pp. 1-6, (Year: 2020).*

B. Dzogovic et al., "Zero-Trust Cybersecurity Approach for Dynamic 5G Network Slicing with Network Service Mesh and Segment-Routing over IPv6," 2022 International Conference on Development and Application Systems (DAS), Suceava, Romania, 2022, pp. 105-114 (Year: 2022).*

* cited by examiner

500

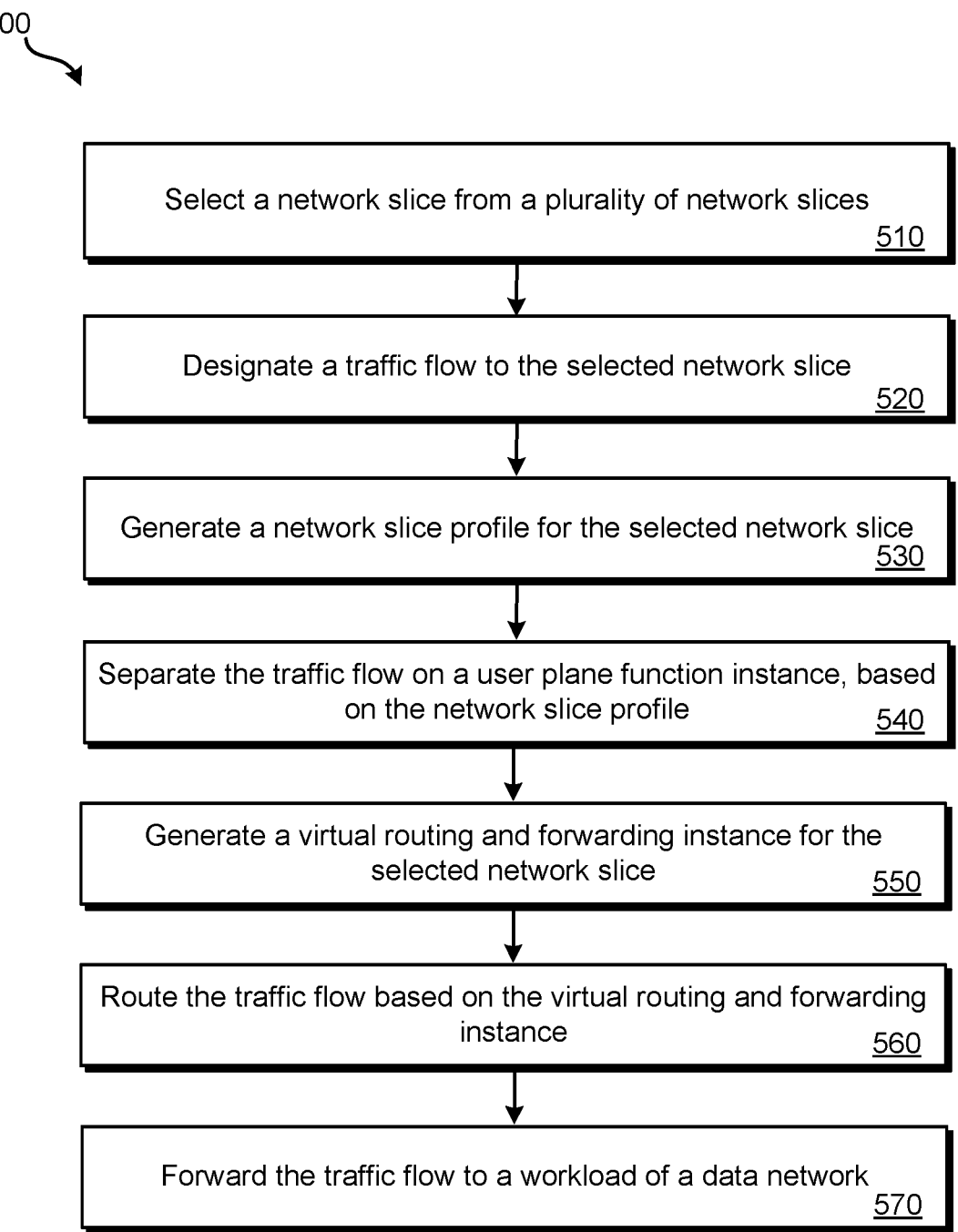

Select a network slice from a plurality of network slices

510

Designate a traffic flow to the selected network slice

520

Generate a network slice profile for the selected network slice

530

Separate the traffic flow on a user plane function instance, based on the network slice profile

540

Generate a virtual routing and forwarding instance for the selected network slice

550

Route the traffic flow based on the virtual routing and forwarding instance

560

Forward the traffic flow to a workload of a data network

ENTERPRISE SLICING LEVERAGING SAME UPF INSTANCE

CROSS REFERENCE TO RELATED APPLICATIONS

This application claims priority to U.S. Provisional Patent Application No. 63/501,092, filed on May 9, 2023, the disclosure of which is incorporated by reference in its entirety for all purposes.

BACKGROUND OF THE DISCLOSURE

Network slicing has been introduced to support various customers and/or services in a cellular communications network. Network slicing is a technology for logically configuring a physical network with a set of network functions (NFs) for supporting a particular service and separating the same from other slices. A user equipment (UE) can access a particular data network (DN) pertaining to a network slice subscribed by or associated with the UE. Similarly, a UE can receive a particular service supported by the network slice subscribed by or associated with the UE. A particular network slice that is appropriate to support a service from among the various service can be designed and generated by a communication service provider or a developer. With the increasing demand on diversified services and/or multiple customers, it is desirable for improving the ability to generate and manage multiple network slices on the same physical network.

BRIEF SUMMARY OF THE DISCLOSURE

In accordance with some embodiments of the present disclosure, a computer-implemented method is provided. In one example, a method includes selecting a first network slice and a second network slice, and both the first network slice and the second network slice pertain to a common data network. The method further includes designating, a first traffic flow to the first network slice and a second traffic flow to the second network slice. The first traffic flow is configured to transport data packets between a first user equipment (UE) associated with the first network slice and a first workload of the data network, and the second traffic flow is configured to transport data packets between a second UE associated with the second network slice and a second workload of the data network. The method further includes generating a first network slice profile, the first network slice profile including a first network identifier that identifies the first network slice and first mapping information that correlates the first traffic flow to the first network slice. The method further includes generating a second network slice profile, the second network slice profile including a second network identifier that identifies the second network slice and second mapping information that correlates the second traffic flow to the second network slice. The method further includes assigning, the first network slice profile to the first traffic flow and the second network slice profile to the second traffic flow. The method further includes separating the first traffic flow from the second traffic flow on a user plane function (UPF) instance, based on the assigned first network slice profile and the second network slice profile and maintaining separation of the first traffic flow and the second traffic flow on the UPF instance.

In accordance with some embodiments of the present disclosure, a system is provided. In one example, the system includes one or more processors and a computer-readable storage media storing computer-executable instructions. The instructions are executable by the one or more processors to cause the system to select a network slice from a plurality of network slices, the plurality of network slices pertaining to a common data network, designate a traffic flow to the selected network slice, and the traffic flow is configured to transport data packets between a UE associated with the network slice and a target workload of the data network, generate a network slice profile for the selected network slice, the network slice profile including a network identifier that identifies the network slice and mapping information that correlates the selected network slice to the designated traffic flow, receive a data packet transmitted from a UE, the data packet including identification information of the UE, determine, based on the identification information, whether the UE is associated with the selected network slice, and cause the data packet to be transported through the designated traffic flow, based on the determination that the UE is associated with the selected network slice.

In accordance with some embodiments, the present disclosure also provides a non-transitory machine-readable storage medium encoded with instructions, the instructions executable to cause one or more processors of a system to perform operations of a method described herein.

BRIEF DESCRIPTION OF THE DRAWINGS

A further understanding of various embodiments may be realized by reference to the following figures. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

FIG. 5 is a flow diagram illustrating an example method, according to various embodiments.

Figure 1:
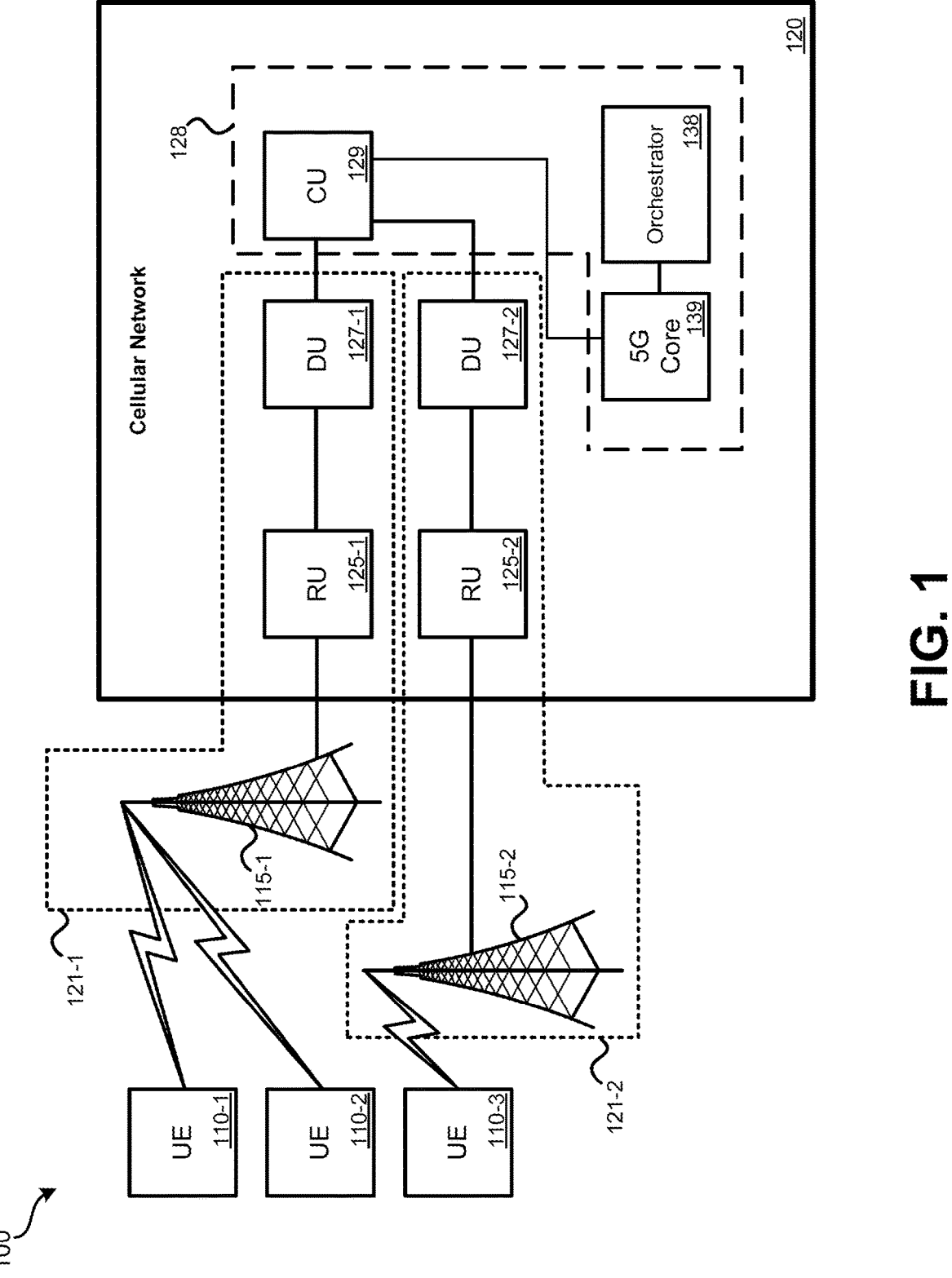
FIG. 1 is a schematic diagram illustrating an overview of an example cellular network, according to various embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION OF THE DISCLOSURE

In the context of Fifth Generation (5G) cellular communication, the connection between the UE and the DN requires the establishment of a PDU session. In this connection the UE first connects to an access point (e.g., a gNodeB) in a Radio Access Network (RAN), and through the transport network reaches a 5G core, which provides an end point to the DN. The transport network may be wireless, wired, or optical connection and the 5G core typically consists of a collection of various network devices and/or functions implementing a Service Based Architecture (SBA). Such network functions may include an Access and Mobility Management Function (AMF), which performs the authentication of UEs and controls the access of UE to the infrastructure; a Session Management Function (SMF), which helps the establishment and closing of PDU sessions and keeps track of the PDU session's state; and a User Plane Function (UPF). Whereas the AMF and the SMF are part of the control plane, the UPF is responsible for the user plane functionality. The UPF serves as a PDU session anchor (PSA) and provides a connection point for the access network to the 5G core. Additionally, a UPF also handles the inspection, routing, and forwarding of the data packets carried by traffic flow, and it can also handle the QoS, apply specific traffic rules, etc. The control and user plane separation (CUPS) guarantees that the individual components can scale independently and allows the data processing to be placed closer to the edge of the network.

Network slicing in a 5G network environment provides customers with the ability to deploy control plane and user plane functions for a group of UEs associated with a particular network slice of a physical network, independent of the access type. However, network resources of the physical network, such as data network name (DNN), infrastructure, cellular network core elements, Internet Protocol (IP) address of the network, are usually scarce. When multiple network slices are generated from the same physical network, it is desirable to improve the overall efficiency of network slice management and network resource utilization.

The present disclosure provides systems, devices, and methods for managing network slices of a network. One insight provided by the present disclosure is that the method can be used to manage a plurality of network slices of a single physical network by leveraging a single UPF instance. A plurality of customers can be hosted, and each customer can access a corresponding network slice without interference by other network slice. Particularly, the method can be used to identify, separate, and isolate a plurality of slice-specific traffic flows with respect to the plurality of network slices, and maintain separation of these slice-specific traffic flows through the UPF on a single UPF instance.

Another insight provided by the present disclosure is that the method can be used to configure one or more network devices in a 5G network environment to designate a particular traffic flow to a selected network slice. Further, the method can be used to generate a network slice profile containing mapping information, which can be configured to correlate the network slice profile to the selected network slice. The network slice profile can include a network slice identifier, a Virtual Data Network Name (VDNN) identifier associated with the selected network slice, a Single Network Slice Selection Assistance Information (S-NSSAI) identifier associated with the VDNN identifier, an IP pool identifier associated with the VDNN identifier, a Virtual Routing and Forwarding (VRF) identifier associated with the IP pool identifier. Based on the unique network slice profile, the traffic flows can be logically separated and isolated to prevent interferences with other traffic flows.

Yet another insight provided by the present disclosure is that the method can be used to generate a slice-specific VRF instance for the selected network slice. The slice-specific VRF instance can be used for routing and forwarding the slice-specific traffic flow from the UPF to the destination data network through a single interface, using label switching routing technology such as Multiprotocol Border Gateway Protocol (MP-BGP). Interference with other traffic flows could be effectively prevented. Each slice-specific traffic flow may be forwarded to a slice-specific workload of the DN through a VRF-aware interface. In this way, a subscriber to a specific network slice may use a slice-specific VDNN to access a slice-specific workload of the DN through a slice-specific traffic flow, without interference with others. Thus, this method could improve resource allocation and allow multiple subscribers of multiple network slices to share the same DNN using multiple VDNNs. In addition, multiple slice-specific services subscribed by the same customer may also be supported by the same DNN through slice-specific traffic flows.

Further detail regarding such embodiments is provided in relation to the figures. The implementations detailed herein can be performed on a hardware-based cellular network. A hardware-based cellular network can use specialized or general-purpose computing hardware maintained directly by the cellular network provider to provide cellular services. Alternatively, implementations detailed herein can be performed on a hybrid-cloud cellular network, such as detailed in relation to FIG. 1.

The core of a 5G New Radio (NR) cellular network can employ a SBA using a service-based interface. At the core of most modern networks and services is typically a cloud-based and virtualization-based platform. This is also the case for 5G networks. A cloud-based and virtualization-based platform can be programmable and can allow many different functions to be built, configured, connected, and deployed at the scale that is needed at the given time. The 3GPP defines an SBA whereby the control plane functionality and common data repositories of a 5G NR network are delivered by way of a set of interconnected NFs, each with authorization to access each other's services. SBAs can provide a modular framework from which common applications can be deployed using components of varying sources and suppliers. The service-based interface can function based on application programming interface (API) calls.

FIG. 1 illustrates a block diagram of a hybrid cellular network system ("system 100"). Such a hybrid cellular network system is partially implemented using specialized hardware and partially implemented using virtualized cellular network components on a cloud-computing platform, such as Amazon Web Services (AWS). System 100 can include a 5G New Radio (NR) cellular network; as noted, other types of cellular networks, such as 6G, 7G, etc., may also be possible. System 100 can include: UE 110 (UE 110-1, UE 110-2, UE 110-3); structure 115; cellular network 120; radio unit 125 ("RU 125"); distributed units 12 ("DU 127"); centralized unit 129 ("CU 129"); 5G core 139; and orchestrator 138. FIG. 1 represents a component-level view. In a virtualized open radio access network (O-RAN), because components can be implemented as specialized software executed on general-purpose hardware, except for components that need to receive and transmit RF, the functionality of the various components can be executed by general-purpose servers. For at least some components, the hardware may be maintained by a separate cloud-service computing platform provider. Therefore, the cellular network operator may operate some hardware, such as base stations that include RUs and local computing resources on which DUs are executed, such components may be connected with a cloud-computing platform on which other cellular NFs, such as the cellular network core and higher-level RAN components, such as CUs, are executed.

UE 110 can represent various types of end-user devices, such as cellular phones, smartphones, cellular modems, cellular-enabled computerized devices, sensor devices, robotic equipment, Internet of Things (IoT) devices, gaming devices, access points, or any computerized device capable of communicating via a cellular network. More generally, UE can represent any type of device that has an incorporated 5G interface, such as a 5G modem. Examples can include sensor devices, IoT devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated; BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the RAN of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on cloud-based computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-based computing platform 128 can execute CU 129, 5G core 139, and orchestrator 138. The cloud-based computing platform 128 can be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. Rather, processing and storage capabilities of the data center would be devoted to the needed functions. When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new CU for test, orchestrator 138 can perform a pipeline of calling the CU code from a software repository incorporated as part of, or separate from cellular network 120, pulling corresponding configuration files (e.g. helm charts), creating Kubernetes nodes/pods, loading CU containers, configuring the CU, and activating other support functions (e.g. Prometheus, instances/connections to test tools).

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter. Particular network slices may only be reserved in particular geographic regions. For instance, a first set of network slices may be present at RU 125-1 and DU 127-1, and a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
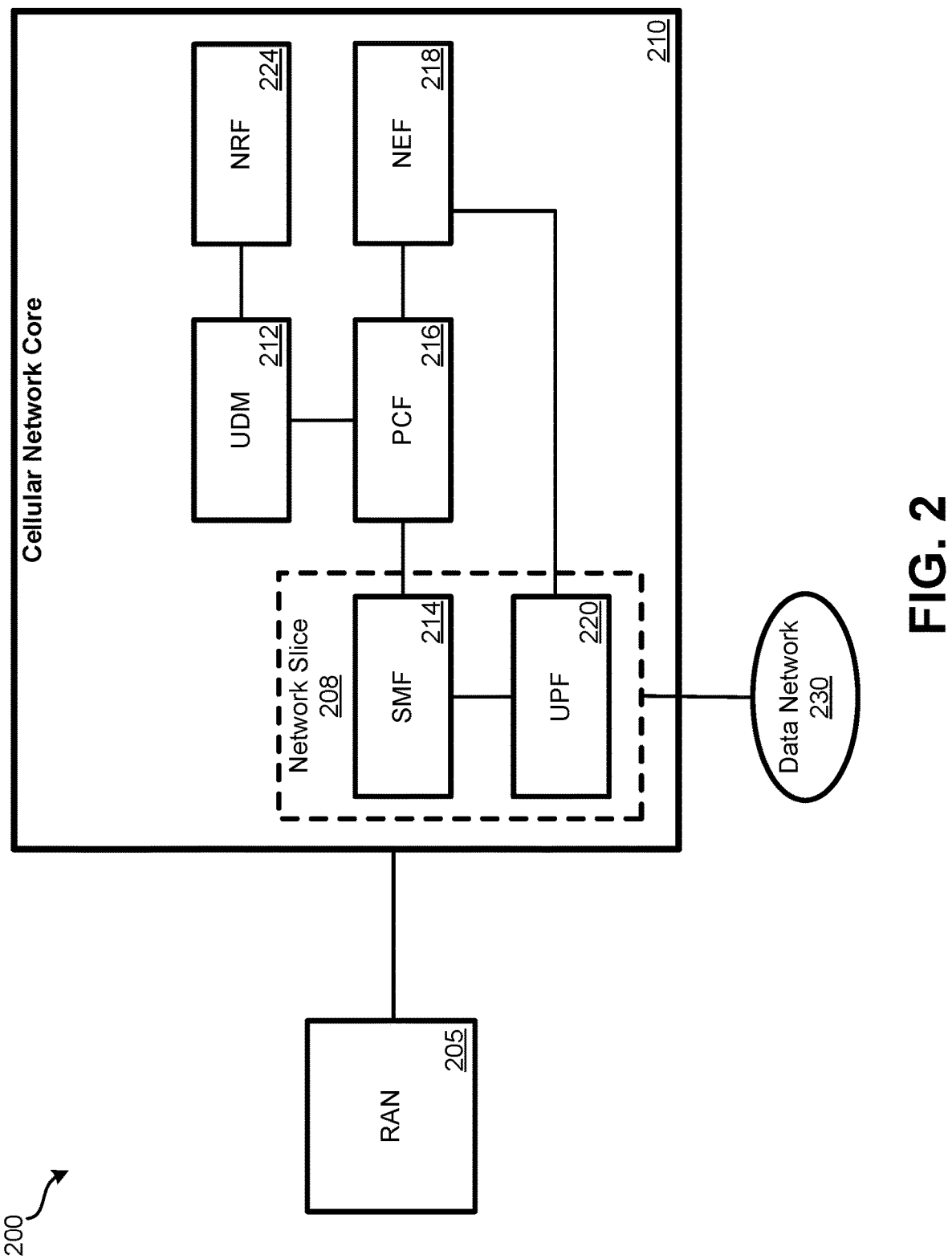
FIG. 2 is a schematic diagram illustrating an example system that includes a cellular network core, according to various embodiments.

FIG. 2 illustrates an embodiment of a cellular network system 200 ("system 200") that includes a cellular network core that exposes data from the user plane function (UPF) that may include static, unique identifiers of particular UE 110, as disclosed herein. Cellular network core 210 ("core 210") can represent an embodiment of 5G core 139 of FIG. 1. Core 210 can include: Unified Data Management 212 ("UDM 212"); Session Management Function 214 ("SMF 214"); Policy Control Function 216 ("PCF 216"); Network Exposure Function 218 ("NEF 218"); UPF 220; Binding Support Function 222 ("BSF 222"); and Network Repository Function ("NRF 224"). It is noted that the core 210 can further include one or more of: a Mobility Management Entity (MME), a Packet Gateway (PGW), a Serving Gateway (SGW), a Home Subscriber Server (HSS), an Authentication, Authorization, and Accounting Server (AAAS), a Policy Charging and Rules Function (PCRF), a Charging System (CS), an Access and Mobility Management Function (AMF), an Authentication Server Function (AUSF), a Network Slice Selection Function (NSSF), a Network Data Analytics Function (NWDAF), and/or an Application Function (AF). According to other exemplary embodiments, the core 210 may include additional, different, and/or fewer devices or functions than those described. For example, core 210 may include a non-standard and/or a proprietary network device/function, or another type of network device/function that may be well-known but not particularly mentioned herein.

UDM 212 is a network function that manages access authorization, user registration, and roaming access. SMF 214 manages interactions on the data plane, creation and removal of protocol data unit sessions and managing session context with the UPF. PCF 216 governs control plane functions and the UPF via defined policy rules. BSF 222 stores binding information for protocol data unit (PDU) sessions and facilitates discovery of NFs and events per the binding information. NRF 224 maintains a repository of the network functions instances and profiles, and facilitates registration and discovery of network functions.

NEF 218 facilitates exposure of network services and capabilities to trusted components outside of the cellular network core. NEF 218 can act as a consolidated API for components of core 210. Via NEF 218, permissions and access to data from core components, including UPF 220, can be controlled. NEF 218 can provide for application functions to securely provide information to a 3GPP network. In this case, the NEF may authenticate, authorize, and/or assist in throttling application functions.

UPF 220 is responsible for packet routing and forwarding between external networks from the cellular network (e.g., Internet 240) and UE communicating with RAN 205 of the cellular network. RAN 205 can represent BSs 121 of cellular network 120 of FIG. 1. UPF 220 functions as a gateway in that cellular network addressed traffic inside of core 210 and RAN 205 is translated to have an external IP address appropriate for communication with the DN 230. From the perspective of a UE, all inbound and outbound communications between the RAN 205 and the DN 230 flows through UPF 220. Therefore, by monitoring data passing through UPF 220, the telecommunication traffic flow for all UE using the cellular network for access to the DN 230 can be monitored.

Figure 3:
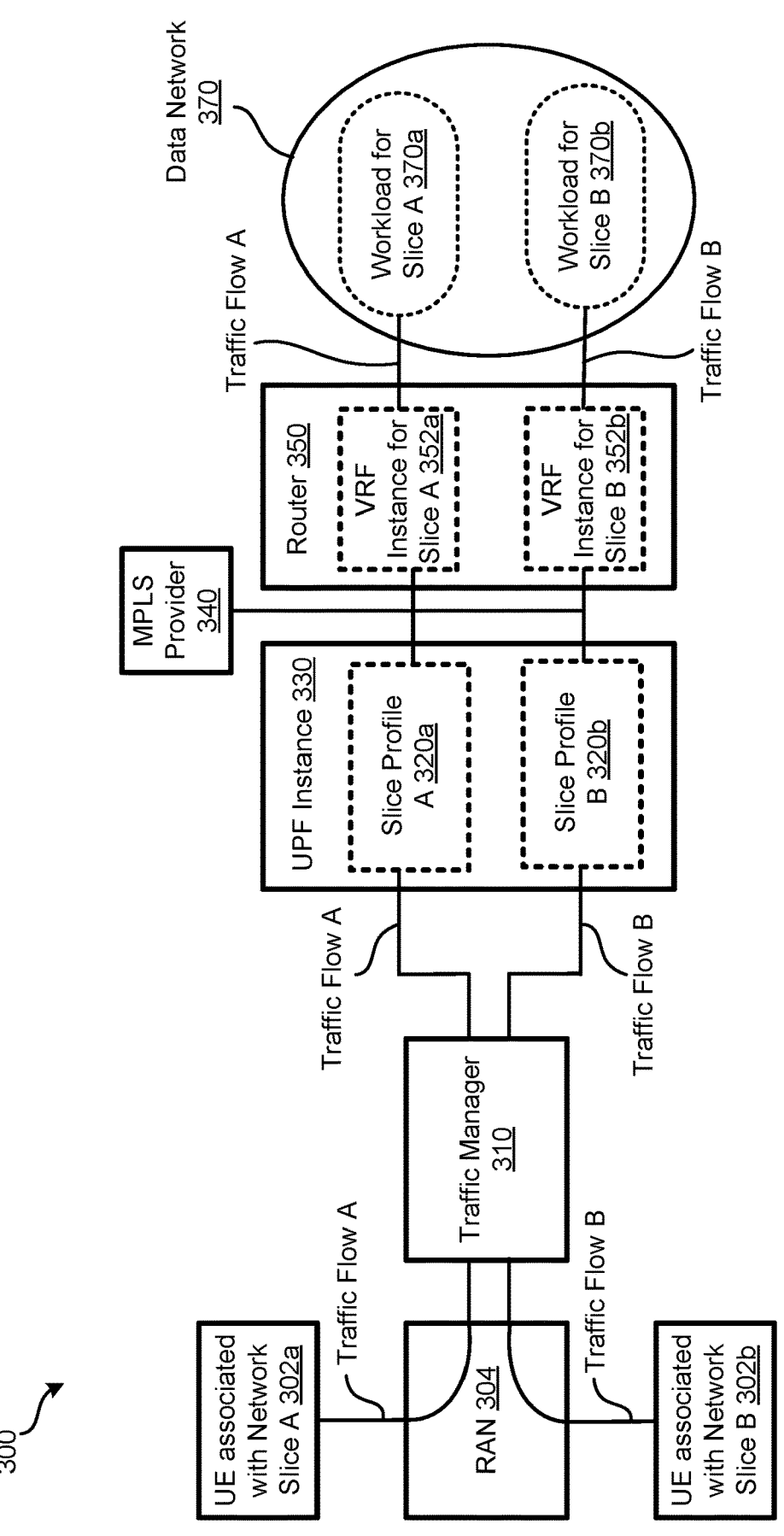
FIG. 3 is a schematic diagram illustrating an example network environment including a plurality of network slices pertaining to a data network, according to various embodiments.

FIG. 3 is an illustrative representation of an example of a 5G network environment 300 according to various embodiments. In the illustrated example, the 5G network environment 300 can be used to establish a logical connection linking a UE 302 and a DN 370 through a designated traffic flow that carries and transports data packets through the logical connection. As mentioned above, the logical connection between the UE 302 and the DN in 5G requires the establishment of a PDU session. In this connection, the UE 302 first directly connects to a RAN 304 (e.g., through a gNodeB in the RAN 304), and successively through a traffic manager 310, a UPF instance 330, a router 350, and then to the DN 370. The 5G network environment 300 may further include interfaces (not shown) between every two components. A UPF instance may handle multiple PDU sessions, and a 5G network core may contain multiple UPF instances.

In the example of FIG. 3, the network environment 300 includes a plurality of network slices (e.g., network slice A, network slice B as an illustration), and the number of network slices may vary in alternative embodiments. Each network slice is associated with and correlated to a designated network traffic flow (e.g., the traffic flow A associated to the network slice A; the traffic flow B associated to the network slice A). Each network slice represents an independent virtualized instance of a network defined by allocation of a subset of available network resources in the 5G network. The traffic flows A and B can be logically separated and isolated by the traffic manager 310, and the logical separation of the traffic flows is maintained on the UPF instance 330, through the transportation through the 5G network core, and between the UEs and the DN 370. Exemplary embodiments of the traffic manager 310 are described below with reference to FIGS. 4A-4C.

A plurality of network slice profiles 320 (e.g., network slice profile A 320a; network slice profile B 320b) are generated and respectively correlated to the plurality of network slices and assigned to the plurality of traffic flows associated therewith. For example, network slice profile A 320a is associated with network slice A; network slice profile B 320b is associated with network slice B. Each network slice profile 320 includes information that identifies the network slice and the corresponding traffic flow. Such information may include a network slice identifier, a S-NS-SAI identifier, an IP address identifier or IP address pool (also referred to as "IP pool") identifier, and/or a VRF identifier.

A plurality of VRF instances 353 (e.g., VRF instance 352a and VRF instance 352b) are generated and respectively correlated to the plurality of network slices and the plurality of traffic flows associated therewith. For example, the VRF instance slice A 352a is associated with the network slice A; the VRF instance slice B 352b is associated with the network slice B. The separate VRF instances 352 are used for routing the traffic flows and maintaining the isolation of traffic flows through the router, based on the network slice profile 320 associated with each network slice. The VRF instances 352 may be generated and configured using a multiprotocol label switching (MPLS) provider 340. Details of the network slice profiles 320, VRF instances 352, and MPLS provider 340 are further described below, with reference to FIGS. 4A-4B.

It is noted that the plurality of network slices (e.g., the network slice A and the network slice B) may be supported by a common UPF (e.g., the UPF that establishes the UPF instance 330) in the network environment 300, as opposed to being supported by separate UPFs. The UPF may establish a single UPF instance 330 responsible for interconnecting packet data unit (PDU) sessions between the different slice-specific UEs and the DN 370 by anchoring the PDU sessions on the same UPF instance 330. Further, each network slice is connected to a designated DN workload of the DN 370 associated with the corresponding network slice (e.g., the workload A associated to the network slice A; the workload B associated with network slice B). As such, the UEs 302 associated with different network slices could share the same DN 370 respectively through their own connections supported by the same UPF instance 330.

Each network slice may serve a particular customer (e.g., an end user, a subscriber), be operated by a particular enterprise (e.g., a network provider, a service provider, an enterprise), or be used for a particular service (e.g., Internet, low-latency service). In some embodiments, the network slice A and the network slice B may be owned and operated by enterprise A and enterprise B, respectively. The UEs 302a associated with the enterprise A and the UEs 302b associated with the enterprise B can be respectively connected to the workload A and workload B of the same DN 370. In some embodiments, the network slice A and the network slice B are used to provide different services to the UEs respectively associated with the network slice A and the network slice B. For example, the network slice A may be used to provide low latency service to subscriber UEs associated with the network slice A; the network slice B may be used to provide non-low latency service to subscriber UEs associated with the network slice B. In some embodiments, the network slice may be an Internet service that could be shared by a plurality of enterprises.

Figure 4A:
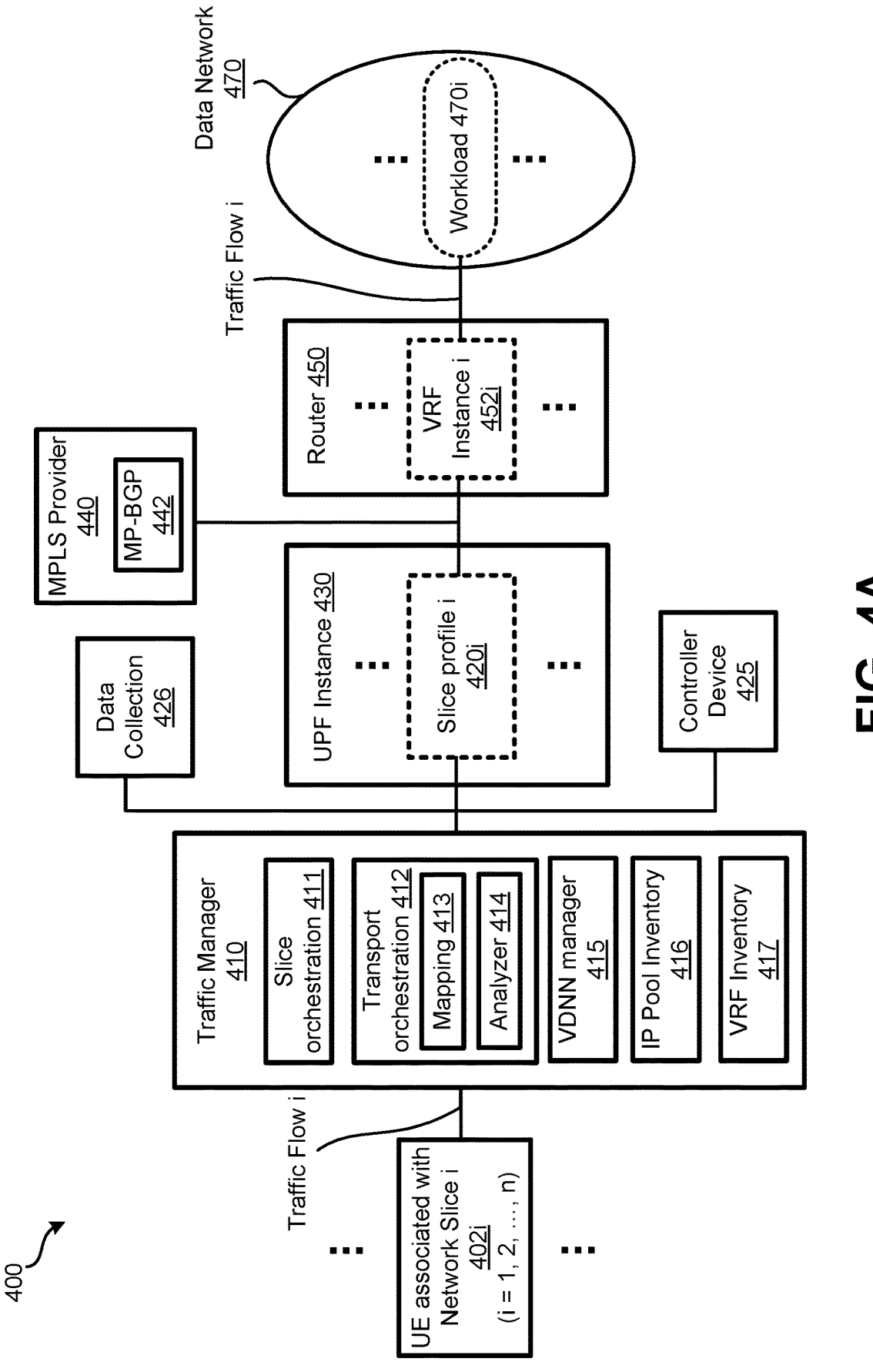
FIG. 4A is schematic diagram illustrating an example network environment, according to various embodiments.
Figure 4B:
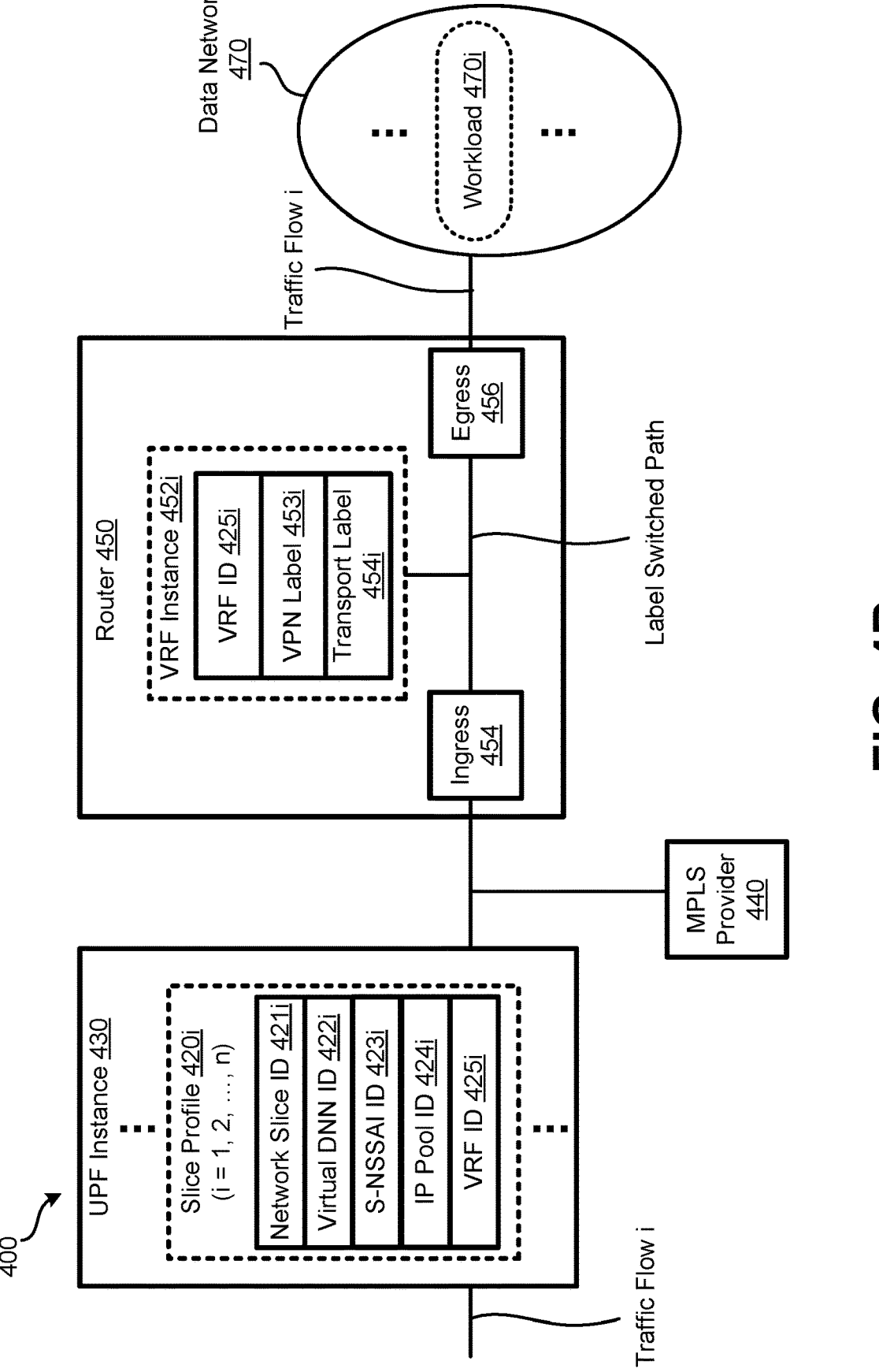
FIG. 4B is schematic diagram illustrating various components of the example network environment of FIG. 4A, according to various embodiments.

FIGS. 4A-4B are schematic diagrams illustrating an example network environment 400 according to various embodiments. In the illustrated example, the network environment 400 includes, among other components, a plurality of network slices (e.g., network slice i, i=1, 2, 3, . . . , n), one or more UEs 402i associated with the corresponding network slice i, a controller device 425, a data collection device 426, a traffic manager 410, a UPF instance 430 supported by a UPF (not shown), a multiprotocol label switching (MPLS) provider, a router 450, and a DN 470. According to other exemplary embodiments, the network environment 400 may include additional, different, and/or fewer components than those described. In addition, one or more components of the network environment 400 (e.g., the UPF) may be a component of a 5G network core (e.g., the 5G network core 210 of FIG. 2) according to the present disclosure.

In the illustrated example, a UE 402i associated with a network slice i (i=1, 2, 3, . . . , n) is connected to a slice-specific workload i of a DN 470 through a slice-specific traffic flow i. Similar to the network environment 300, the plurality of network slices are supported by the same UPF instance 430 and share the DN 470. The traffic manager 410 can be used to logically separate and isolate the slice-specific traffic flows, according to their corresponding network slices. For each network slice i, a VDNN i of the DN 470 is assigned to the network slice i, and a corresponding network slice profile 420i can be generated on the UPF instance 430 by the traffic manager 410. A VDNN is a logic name referring to an external packet data network and/or to a specific service that the subscriber wishes to connect to. VDNNs allow differentiated services within a single DNN; it also allows a provider to use a single DNN to configure differentiated services. Multiple VDNNs can be associated with a single DNN, for example, using the same Mobile Country Code/Mobile Network Code (MCC/MNC).

Each network slice profile 420i can include data fields containing information that identifies the corresponding network slice i. For each network slice (i=1, 2, 3, . . . , n), a VRF instance 452i is generated and configured by a MPLS provider 440, and each VRF instance 452i is described by a VRF instance profile containing information (stored in a data field) that identifies the corresponding network slice i. The data packets carried by the traffic flow i are further forwarded to the slice-specific workload 470i of the DN 470, according to the slice-specific VRF instance. Details of the network slice profile 420i and VRF instance 452i are further described below.

The traffic manager 410 functions as a network transport orchestrator and includes one or more network devices and/or functions to provide network traffic flow identification, isolation, and separation service. In the illustrated example, the traffic manager 410 includes a network slice orchestration device 411, a transport orchestration device 412, a VDNN inventory 415, an IP pool inventory 416, and a VRF inventory 417. It is noted that the traffic manager 410 may further include one or more elements of the 5G network core 210 (FIG. 2), such as MME, PGW, SGW, HSS, AAA, PCRF, CS, UPF, AMF, SMF, UDM, AUSF, NSSF, NRF, PCF, NWDAF, NEF, AF, or a component thereof. According to other exemplary embodiments, the traffic manager 410 may include additional, different, and/or fewer network devices and functions than those described. Also, according to some embodiments, one or more functions and/or processes described as being performed by a particular device may be performed by a different device, or some combination of devices, which may or may not include the particular device. Additionally, a single network device may be implemented as multiple network devices, and/or multiple network devices may be implemented as a single network device. According to an exemplary embodiment, the traffic manager 410 includes logic that provides traffic flow identification, separation, and management services, as described herein.

The network slice orchestration device 411 includes one or more network devices and/or functions comprising logic that identifies the network slice i and correlates the network slice i with the designated traffic flow i (i=1, 2, 3, . . . , n). For example, the network slice orchestration device 411 may provide the transport orchestration device 412 with a network slice identifier of a network slice, as described herein. According to an exemplary embodiment, the network slice identifier is an S-NSSAI identifier. According to other exemplary embodiments, the network slice identifier may be of a different format than the S-NSSAI (e.g., proprietary, nonstandard, etc.). According to an exemplary embodiment, the network slice identifier may be embedded into an IPV6 address. For example, the S-NSSAI identifier may be embedded within a subnet identifier portion of the IPV6 address, within the 64 Most Significant Bits portion of the IPV6 address (e.g., within the routing prefix portion or routing prefix and subnet identifier portion of the IPV6 address), or within another portion of the IPV6 address (e.g., interface identifier portion), or some combination thereof. The IPV6 address may be used in packets of the traffic flow i associated with an application service that traverse the network slice i.

The network slice orchestration device 411 may also comprise logic that coordinates, authorizes, releases and/or engages network resources for a network slice. The network slice orchestration device 411 may obtain network slice descriptors of a network slice that satisfy network level requirements for a service request. The network slice orchestration device 411 may use network resource and capability information, cost information, service request requirement information, and other types of network information for management of the network slice. According to various exemplary embodiments, The network slice orchestration device 411 may include various network devices, such as for example, a Network Functions Virtualization Orchestrator (NFVO), a Generic Virtual Network Function Manager (GVNFM), a Specialized Virtual Network Function Manager (SVNFM), a Virtual Infrastructure Manager (VIM), a Data Center SDN Controller, a Virtual Infrastructure Manager (VIM), a Slice Manager, Interfaces, Plug-ins, Workflows, Slice Templates, a Common Information Model (CIM), network forwarding graphs, and so forth. The network slice orchestration device 411 may perform various functions such as, for example, network slice life cycle management, configuration management (e.g., policies, isolation of management), performance management (e.g., service level agreement (SLA) management, service assurance and programmability), service mapping, and so forth.

In some embodiments, a network slice profile 420$i$ corresponding to the network slice i (i=1, 2, 3, . . . , n) is generated by the traffic manager 410 and assigned to the traffic flow i corresponding to the network slice i. As shown in FIG. 4B, the network slice profile 420$i$ may include multiple data fields that contain information identifying and describing the corresponding network slice i. As an example, the network slice profile 420$i$ may include a first data field 421$i$ containing the network slice identifier (or the network service identifier); a second data field 422$i$ containing the VDNN identifier associated with the network slice i; a third data field 423$i$ containing a S-NSSAI identifier 423$i$ associated with the network slice i; a fourth data field containing an IP pool identifier associated with the network slice i; and a fifth data field containing VRF identifier associated with the network slice i. According to other exemplary embodiments, the network slice profile 420$i$ may include additional, fewer, and/or different data fields containing other information that identifies slice-specific network slice and traffic flow.

The transport orchestration device 412 includes one or more network devices and/or functions comprising logic that separates the traffic flows according to the corresponding network slices and maintain each traffic flow i (i=1, 2, 3, . . . , n) separated and isolated through the network environment 400. For example, the transport orchestration device 412 may map or correlate the network slice identifier to a VDNN identifier, an IP pool identifier, a VRF identifier, as described herein. The transport orchestration device 412 may configure (or configure in conjunction with another network device) network devices with at least a portion of the mapping or correlation. For example, the network devices may be configured with the network slice identifier and the IP pool identifier, the S-NSSAI identifier, the VDNN identifier, the IP pool identifier and the VRF identifier, or some other combination of the correlated information, as described herein. Additionally, the transport orchestration device 412 may receive and analyze feedback information pertaining to the network slice. For example, the feedback information may indicate performance metric information relating to latency, packet error rate, packet drop rate, reliability, bit rates (e.g., guaranteed, maximum, minimum, average, etc.), throughput, jitter, traffic class, round trip time (RTT), and/or other quality of service, SLA, key performance indicators (KPIs), etc., parameters.

The transport orchestration device 412 may further include a mapping device/function 413 and a network slice analyzer 414. According to other exemplary embodiments, the transport orchestration device 412 may include additional, fewer, and/or different components. For example, the transport orchestration device 412 may not include network slice analyzer 255.

The mapping device 413 includes a component that assigns a VRF identifier and an IP pool identifier to a corresponding network slice identifier. For example, the mapping device 413 may store and/or have access to a VDNN inventory 415, an IP pool inventory 416, and a VRF inventory 417. The VDNN inventory 415 include multiple VDNNs derived from the same DNN of the DN 470; the IP pool inventory 416 includes multiple IP pools; and the VRF inventory 417 includes multiple VRF instances 452, and each VRF instance 452$i$ includes a unique VRF identifier associated to the corresponding network slice i.

The mapping device 413 may use VRF inventory 417 to select VRF instance 452$i$ and assign the VRF identifier associated therewith to the network slice i. In some embodiments, the VRF inventory 417 stores all VRF instances configured in a network. For example, a VRF instance 452i may include a virtual routing table and a virtual forwarding table that relates to one or multiple network devices in the corresponding traffic flow i. The VRF inventory 417 may also store other types of information, such as VRF instances and VRF identifiers that are currently assigned and/or active and VRF instances and VRF identifiers that are not currently assigned and/or active, enterprise information and geographic location information pertaining to the VRF instances and/or VRF identifiers, and/or other types of metadata pertaining to the VRF instances (e.g., type of the network devices, endpoints of VRF instance, corresponding DN workload identifier, etc.).

The mapping device 413 also assigns an IP pool to a corresponding network slice i. For example, the mapping device 413 may store or have access to the IP pool inventory 416. The mapping device 413 may select an IP pool from the IP pool inventory 416 to assign the IP pool identifier associated therewith to the corresponding network slice i. The IP pool inventory 416 may also store other types of information, such as enterprise information and geographic location information pertaining to the IP pool identifiers and/or other types of metadata.

Similarly, the mapping device 413 may assign a VDNN to a corresponding network slice i. For example, the mapping device 413 may store or have access to the VDNN inventory 415. The mapping device 413 may select a VDNN from the VDNN inventory 415 and assign the VDNN identifier associated therewith to the corresponding network slice i. The VDNN inventory 415 may also store other types of information, such as enterprise information and geographic location information pertaining to the VDNN identifiers and/or other types of metadata.

The mapping device 413 may store mapping information based on the assigned VRF identifiers, IP pool identifiers, and VDNN identifiers, and respectively generate a network slice profile 420i for each snetwork slice i. As mentioned above, the network slice profile 420i may be in a tabular form including a network slice/service identifier (ID) field 421i, a VDNN identifier field 422i, a S-NSSAI identifier field 423i, an IP pool identifier 424i field, and a VRF identifier field 425i. The mapping information of the network slice profile 420i is illustrated in tabular form merely for the sake of description. In this regard, the mapping information may be implemented in a data structure different from a table.

The network slice ID field 421i may store a network slice identifier. For example, the network slice identifier may include a Slice Service Type (SST) field and a Slice Differentiator (SD) field. According to other embodiments, the network slice identifier may be different from an S-NSSAI identifier (e.g., proprietary network slice identifier, a non-standard network slice identifier, etc.). The VRF ID field 425i may store an identifier of the corresponding VRF instance 452i. For example, the VRF identifier may identify the end points of a VRF or service group; the VRF identifier may identify an end-to-end VRF (e.g., DU to an application service server (not shown), etc.), or another segment of the corresponding network slice (e.g., DU to UPF, etc.). The IP pool field 365 may store an IP pool identifier. For example, the IP pool identifier may be an IPV6 pool identifier that identifies an IP pool of a corresponding network slice i. The IP pool may be supported by the corresponding VRF instance 452i.

According to other exemplary embodiments, the network slice profile 420i may store additional, fewer, and/or different data fields of mapping information in support of the traffic flow identification and separation, as described herein. In some embodiments, the network slice profile 420i may store a data field that indicates an application service or a category of the application service for which the network slice and other correlated information support.

According to various exemplary embodiments, as described herein, multiple network slices may be mapped or correlated to the same VRF instance, or a network slice and a VRF instance may be implemented as a one-to-one mapping. In some embodiments, there may be one or multiple VRF instances correlated to the same network slice or a one-to-one mapping.

The mapping device 413 may configure network devices of each of the network slices with mapping information to identify, separate, and isolate the slice-specific traffic flow. For example, based on the configuration of the network devices according to the network slice profile 420i, the traffic manager 410 may identify the network slice identifier assigned to a data packet received by the traffic manager, determine whether the data packet is associated with a slice-specific traffic flow i, and use the IP pool identifier associated with the network slice identifier for routing/forwarding the data packet in relation to the network slice i.

The network slice analyzer 414 includes a component that receives and analyzes feedback information from the configured network devices of the corresponding network slice i. For example, the feedback information may include performance, quality of service, SLA requirement parameters and values. Network slice analyzer 414 may have access to the mapping information provided in the corresponding network slice profile 420i. In this way, network slice analyzer 414 may correlate a VRF identifier and/or an IP pool identifier, which may be included in the feedback information, to the corresponding network slice i. According to some exemplary embodiments, the network slice analyzer 414 may receive feedback information from network devices. According to some exemplary embodiments, the network slice analyzer 414 may generate recommendations regarding a configured network slice 420i based on the analysis, and provide the recommendation to network slice orchestration device 411.

The controller device 425 may include a network device that interfaces with various components and network devices in the network environment 400, as described herein. For example, the controller device 425 may be implemented as a domain controller, a network function manager, or other type of configuring network device. The controller device 425 may obtain mapping information from the traffic manager 410 or a component thereof (e.g., the mapping device 413), and configure the various network devices with the mapping information, as described herein.

The data collection device 426 may include a network device that collects and forwards feedback information from various components and network devices in the network environment 400, as described herein. The data collection device 426 may obtain feedback information from the various components and network devices, and provide the feedback information to the traffic manager 410 or a component thereof (e.g., network slice analyzer 414).

In some embodiments, a plurality of VRF instances 452i may be generated and configured for routing the plurality of the network slice i. Each VRF instance 452i corresponds to a particular network slice i. The VRF instance 452i is configured to only forward data packets transported by the corresponding traffic flow i and prevent other traffic flows from mixing with the corresponding traffic flow i. Each VRF instance 452i may be configured by the MPLS provider 440 to generate a VRF profile (or VRF table containing multiple data fields that identify the VRF and correlate to the network slice) of the slice-specific VRF instance. For example, a VRF profile may contain the VRF ID field 425i, a Virtual Private Network (VPN) label field 453i, and a transport label field 454i, with respect to the corresponding network slice i. The traffic flow i is routed and forwarded by the router 450 according to the corresponding VRF profile.

In some embodiments, a label switched path (LPS) is established between an ingress 454 and an egress 456 of the router 450, by the MPLS provider 440 for the routing the traffic flow i. The MPLS provider 440 may employ a MP Border Gateway Protocol (MP-BGP) 442 to establish a LSP for the plurality of traffic flows, and maintain isolation of the traffic flows between the ingress 454 and the egress 456 through the LSP by label switching/exchange. For example, data packets originating from the UPF and carried by the traffic flow i is received at the ingress 454, transported along the LSP according to the VPN label 453i and the transport label 454i of the VRF instance 452i assigned to the data packets, and further forwarded to the egress 456 of the router 450 to egress out of the router 450. The egress traffic flow i may be forwarded via a VRF-specific interface (not shown) to the corresponding DN workloads of the DN 470.

In some embodiments, the MPLS provider 440 may use VRF instance 452i to look up routing for the IP pool identifier of the corresponding network slice i, according to the corresponding network slice profile 420i. Based on the result of the lookup, the MPLS provider 440 may push a MPLS label stack (e.g., the VPN label 453i and the transport label 454i of the VRF instance profile 450i) onto the traffic flow i (or the data packet carried by the traffic flow i) to be forwarded according to the IP pool assigned to the network slice i. The transport label 454i is used to forward the traffic flow i from the ingress 454 to the egress 456 along the corresponding LSP, and the VPN label 453i provides the "context" in which to forward the traffic flow i, according to the assigned IP pool. In some embodiments, the forwarding context may be maintained after directing the traffic flow i through the router 450 by configuring the VRF instance 452i to indicate that the VPN label 453i allocated for the destination of the traffic flow i by the router 450 so that it can continue to forward the traffic flow i within the correct forwarding context. It should be noted that router 450 may use a per-prefix label, or alternatively a per-VRF label thereby forcing a lookup of the destination within the labeled VRF instance.

In some embodiments, the IP pools assigned to the various network slices are the same, but the multiple traffic flows are labeled with different VPN/transport labels. In this way, the multiple traffic flows can still be separately routed through label switching/exchange, such that the IP pools can be shared/reused by different traffic flows, thereby further saving the IP address resources. In some embodiments, the traffic flows are forwarded from the UPF to the router 450 through only one single interface (e.g., the VRF-aware interface), while the separation of traffic flows can still be maintained by the MPLS provider 440 through label switching/exchange.

FIG. 5 is a flow diagram illustrating an example method 500 according to various embodiments. According to an exemplary embodiment, one or more network device could perform steps of the method 500. For example, the network device may be the traffic manager 410, the MPLS provider 440, another element of the 5G core 210, an additional network device/function external to the 5G core, or any combination thereof. Additionally, for example, a processor (e.g., the processor 610 of FIG. 6) of the network device may execute an instruction (e.g., the instruction 620 of FIG. 6) to perform a step illustrated in FIG. 5 and described herein. Additionally, or alternatively, a step illustrated in FIG. 5 may be performed by execution of only hardware.

At 510, one or more network slices are selected from a plurality of network slices. The plurality of network slices may be generated by dividing a single physical network of a 5G cellular network, and each of the plurality of network slices may pertain to a slice-specific workload of a single data network external to the 5G core. In some embodiments, each network slice is used by a customer to provide a slice-specific application or service to the subscriber UEs associated with the customer. In some embodiments, the customer may be a service provider, a carrier, or an enterprise. In some embodiments, a first network slice and a second network slice are selected from a plurality of network slices.

At 520, a traffic flow is designated to the selected network slice. The traffic flow is configured to identify a connection established by the PDU session between a UE associated with the selected network slice and the slice-specific workload of the data network. The designated traffic flow can carry and transport data packets between the UE and the slice-specific workload. In some embodiments, a first traffic flow is designated to the first network slice; a second traffic flow is designated to the second network slice.

At 530, a network slice is generated for the selected network slice. The network slice profile contains a network identifier that identifies the first network slice and mapping information. In some embodiments, the mapping information further contains a S-NSSAI identifier that identifies the selected network slice, a VDNN identifier that identifies a VDNN of the data network, an IP pool identifier that identifies an IP pool of addresses, and a VRF identifier that identifies a VRF instance. The mapping information can be used to respectively correlate the S-NSSAI, the VDNN, the IP pool, and the VRF instance to the selected network slice and the designated traffic flow associated therewith. In this way, the S-NSSAI can be associated with the VDNN; the VDNN can be associated with the IP pool; the IP pool can be associated with the VRF instance. In some embodiments, a network slice profile is generated for each one of the plurality of the network slices. In some embodiments, the virtual DNNs included in the plurality of network slice profiles are supported by a single DNN of the DN shared by the plurality of network slices. In some embodiments, a first network slice profile and a second network slice are respectively generated. The first network slice profile contains a first network identifier that identifies the first network slice and first mapping information that correlates the first traffic flow to the first network slice, and the second network slice profile contains a second network identifier that identifies the second network slice and second mapping information that correlates the second traffic flow to the second network slice.

At 540, the traffic flow associated with the selected network slice is separated and isolated from other traffic flows, by a network device such as the traffic manager described herein, based on the network slice profile of the selected network slice. In some embodiments, a plurality of traffic flows are separated and isolated, and the separation and isolation of the plurality of traffic flows can be maintained through the UPF on the same UPF instance supported by the UPF.

In some embodiments, a process may be performed to separate the traffic flow for the selected network slice. In an example of the process, a data packet transmitted from a UE is received by the traffic manager, the data packet containing identification information such as the UE information, subscription information, etc. A determination is made on whether the UE is associated with the selected network slice of the plurality of network slices, based on the identification information contained in the data packet. When the UE is determined to be associated with the selected network slice, the data packet is transported to the UPF through the traffic flow designated to the network slice, according to the network slice profile associated therewith. For example, the packet data may be correlated to the selected network slice by the mapping information (e.g., S-NSSAI, the VDNN, the IP pool, and the VRF instance) contained in the network slice profile. The process may be applied to each and every data packet received by the traffic manager. In this way, the traffic flows transporting various slice-specific data packets can be separated and isolated according to the network slice profiles.

At 550, a VRF instance is generated for the selected network slice. The VRF instance may be identified by a VRF instance profile containing information that correlates the VRF profile to the selected network slice. In some embodiments, the VRF instance profile may include a VRF identifier, a VPN label, and a transport label. The VRF instance may be configured to correlate the VRF identifier to the network slice profile of the selected network slice, and assign the VPN label and the transport label to the traffic flow designated to the selected network slice and/or the data packet transported by the slice-specific traffic flow.

In some embodiments, a first VRF instance and a second VRF instance are respectively generated. The first VRF instance contains a first VRF identifier assigned to the first network slice profile; the second VRF instance contains a second VRF identifier assigned to the second network slice profile. The first VRF instance may further contain a first VPN label and a first transport label associated with the first network slice; the second VRF instance may further contain a second VPN label and a second transport label associated with the second network slice.

At 560, the traffic flow designated to the selected network slice is routed by a router based on the slice-specific VRF instance. In some embodiments, an LSP between an ingress and an egress of the router is established to route the slice-specific traffic flow, using MP-BGP. The LSP may allow exclusive passage of the data packets carried by the slice-specific traffic flow, based on the VPN label and the transport label of the VRF instance assigned to the data packets or associated with the selected network slice. In some embodiments, the first traffic flow and the second traffic flow are respectively and separately routed through the LSP, based on the first virtual private network label and the first transport label assigned to the first traffic flow and the second virtual private network label and the second transport label assigned to the second traffic flow. In this way, multiple traffic flows can be routed separately through the LSP. In a case where the traffic flows are forwarded from the UPF to the router through a single interface, the separation of the traffic flows can still be maintained through use of the LSP routing.

At 570, the slice-specific traffic flow that egresses out of the router is forwarded to the slice-specific workload of the DN, through a VRF-aware interface between the router and the DN. In some embodiments, the first traffic flow is forwarded to the first workload and the second traffic flow is forwarded to the second workload.

Figure 6:
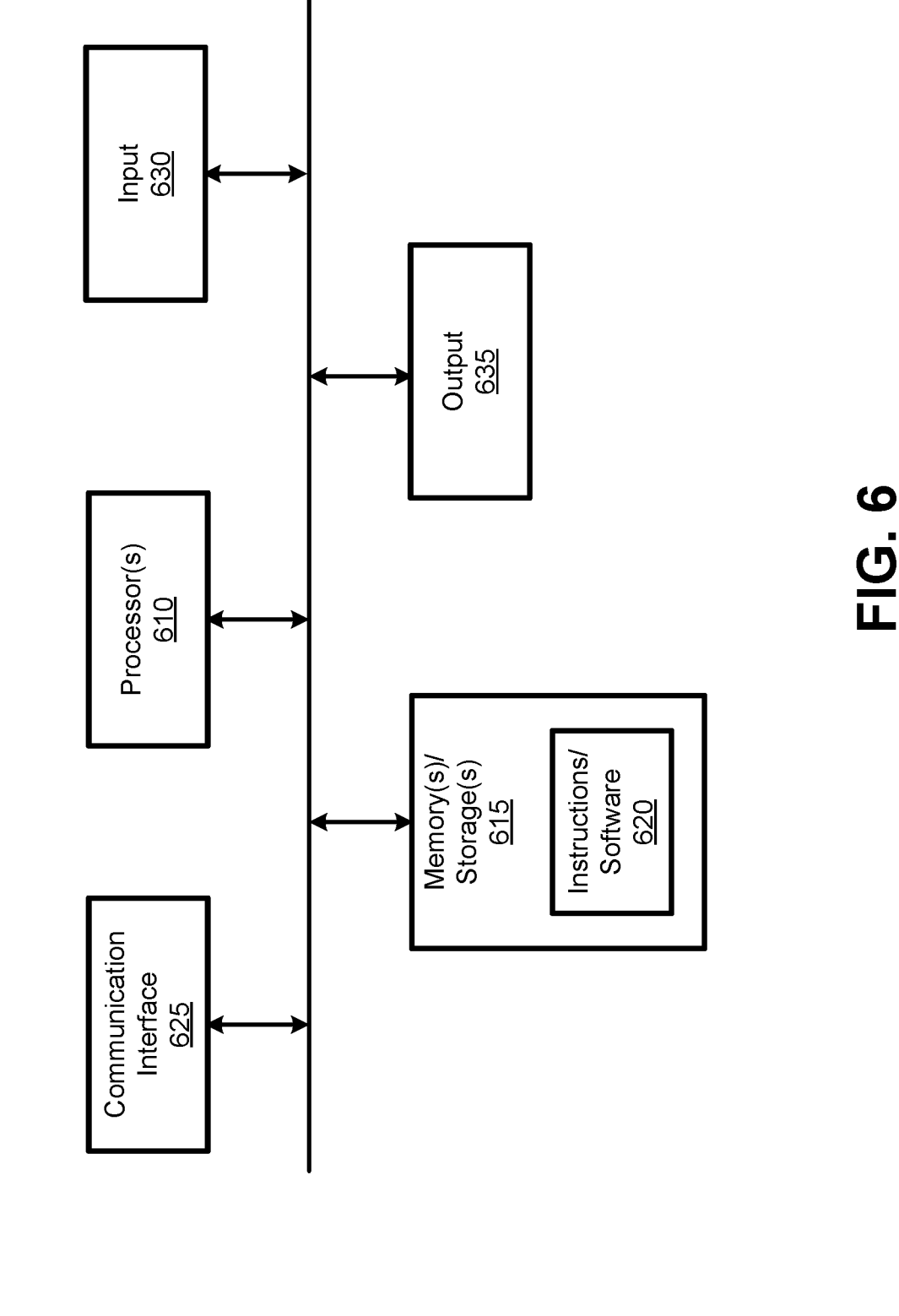
FIG. 6 is schematic diagram illustrating exemplary components of a device that may correspond to one or more of the devices illustrated and described according to the present disclosure.

FIG. 6 is a diagram illustrating exemplary components of a device 600 that may be included in one or more of the devices described herein. For example, device 600 may correspond to components included in UE, traffic manager, RAN, RU, DU, CU, orchestrator, router, UPF, SMF, UDM, PCF, NEF, etc. As illustrated in FIG. 6, device 600 includes a bus 605, one or more processors 610, one or more memories/storages 615 that stores instructions or software 620, one or more communication interfaces 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, graphics processing units (GPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a content addressable memory (CAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory (e.g., high bandwidth memory (HBM), stacked memory, hybrid memory, etc.). Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application, an instruction, or a program that provides a function and/or a process. As an example, with respect to traffic manager 410, software 620 may include an instruction that, when executed by processor 610, provides a function of the traffic flow separation, as described herein. Additionally, with reference to other devices according to the present disclosure, software 620 may include an instruction that, when executed by processor 610, provides a function of the traffic flow separation, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces wired interfaces, and/or optical interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.), a network interface card, a port, and/or other type of communication element. Communication interface 625 may be implemented as a point-to-point interface, a service based interface, etc.

Input 630 permits an input into device 600. For example, input 630 may include a keyboard, a mouse, a display, a touchscreen, a touchless screen, a button, a switch, an input port, speech recognition logic, a microphone, an image and/or video capture device, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a public/private cloud or other type of network.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method comprising:
selecting a first network slice and a second network slice, wherein both the first network slice and the second network slice pertain to a common data network
designating, a first traffic flow to the first network slice and a second traffic flow to the second network slice, wherein the first traffic flow is configured to transport data packets between a first user equipment (UE) associated with the first network slice and a first workload of the data network, and wherein the second traffic flow is configured to transport data packets between a second UE associated with the second network slice and a second workload of the data network;
generating a first network slice profile, the first network slice profile including a first network identifier that identifies the first network slice and first mapping information that correlates the first traffic flow to the first network slice;
generating a second network slice profile, the second network slice profile including a second network identifier that identifies the second network slice and second mapping information that correlates the second traffic flow to the second network slice;
assigning, the first network slice profile to the first traffic flow and the second network slice profile to the second traffic flow, such that the first traffic flow is specific to the first network slice and the second traffic flow is specific to the second network slice, wherein the first network slice profile comprises an IP pool identifier assigned to the first network slice, the IP pool identifier identifying an IP pool of addresses, and the second network slice profile comprises the IP pool identifier assigned to the same IP pool of addresses; and
separating the first slice specific traffic flow from the second slice specific traffic flow on a single user plane function (UPF) instance, based on the assigned first network slice profile and the second network slice profile, wherein the first traffic flow and the second traffic flow are maintained separate on the single UPF instance.

2. The method of claim 1, further comprising:
receiving a data packet transmitted from a UE, the data packet including identification information of the UE;
determining, based on the identification information, whether the UE is associated with the first network slice or the second network slice; and
in response to the determination, causing the data packet to be transported through the first traffic flow or the second traffic flow, based on the first mapping information and the second mapping information.

3. The method of claim 1, further comprising:
generating, a first virtual routing and forwarding instance and a second virtual routing and forwarding instance, the first virtual routing and forwarding instance including a first virtual routing and forwarding identifier associated with the first network slice profile, the second virtual routing and forwarding instance including a second virtual routing and forwarding identifier associated with the second network slice profile;
routing, separately, the first traffic flow and the second traffic flow, based on the first virtual routing forwarding instance and the second virtual routing forwarding instance; and forwarding, the first traffic flow to the first workload and the second traffic flow to the second workload.

4. The method of claim 3, further comprising:
generating a first virtual private network (VPN) label and a first transport label in the first virtual routing and forwarding instance and assigning the first virtual private network label and the first transport label to the first traffic flow; and
generating a second virtual private network label and a second transport label in the first virtual routing and forwarding instance and assigning the second virtual private network label and the second transport label to the second traffic flow.

5. The method of claim 4, wherein further comprising:
establishing, using multiprotocol border gateway protocol (MP-BGP), a label switched path to route the first traffic flow and the second traffic flow, based on the first virtual private network label and the first transport label assigned to the first traffic flow and the second virtual private network label and the second transport label assigned to the second traffic flow.

6. The method of claim 1, wherein,
the first network slice profile comprises a first single network slice selection assistance information (S-NS-SAI) identifier assigned to the first network slice; and
the second network slice profile comprises a second single network slice selection assistance information identifier assigned to the second network slice.

7. The method of claim 1, wherein,
the first network slice profile comprises a first virtual data network name (VDNN) of the data network assigned to the first network slice; and
the second network slice profile comprises a second virtual data network name of the data network assigned to the first network slice.

8. A system, comprising:
one or more processors; and
a computer-readable storage media storing computer-executable instructions that, when executed by the one or more processors, cause the system to perform:
selecting a first network slice and a second network slice, wherein both the first network slice and the second network slice pertains to a common data network;
designating, a first traffic flow to the first network slice and a second traffic flow to the second network slice, wherein the first traffic flow is configured to transport data packets between a first user equipment (UE) associated with the first network slice and a first workload of the data network, and wherein the second traffic flow is configured to transport data packets between a second UE associated with the second network slice and a second workload of the data network;
generating a first network slice profile, the first network slice profile including a first network identifier that identifies the first network slice and first mapping information that correlates the first traffic flow to the first network slice;
generating a second network slice profile, the second network slice profile including a second network identifier that identifies the second network slice and second mapping information that correlates the second traffic flow to the second network slice;
assigning, the first network slice profile to the first traffic flow and the second network slice profile to the second traffic flow, such that the first traffic flow is specific to the first network slice and the second traffic flow is specific to the second network slice, wherein the first network slice profile comprises an IP pool identifier assigned to the first network slice, the IP pool identifier identifying an IP pool of addresses, and the second network slice profile comprises the IP pool identifier assigned to the same IP pool of addresses;

separating the first slice specific traffic flow from the second slice specific traffic flow on a single user plane function (UPF) instance, based on the assigned first network slice profile and the second network slice profile; and maintaining the separation of the first traffic flow and the second traffic flow on the single UPF instance.

9. The system of claim 8, wherein, when executed by one or more processors, the computer-executable instructions further cause the system to perform:

receiving a data packet transmitted from a UE, the data packet including identification information of the UE;

determining, based on the identification information, whether the UE is associated with the first network slice or the second network slice; and in response to the determination, causing the data packet to be transported through the first traffic flow or the second traffic flow, based on the first mapping information and the second mapping information.

10. The system of claim 8, wherein, when executed by one or more processors, the computer-executable instructions further cause the system to perform:

generating, a first virtual routing and forwarding instance and a second virtual routing and forwarding instance, the first virtual routing and forwarding instance including a first virtual routing and forwarding identifier associated with the first network slice profile, the second virtual routing and forwarding instance including a second virtual routing and forwarding identifier associated with the second network slice profile;

routing, separately, the first traffic flow and the second traffic flow, based on the first virtual routing forwarding instance and the second virtual routing forwarding instance; and forwarding, the first traffic flow to the first workload and the second traffic flow to the second workload.

11. The system of claim 10, wherein, when executed by one or more processors, the computer-executable instructions further cause the system to perform:

generating a first virtual private network (VPN) label and a first transport label in the first virtual routing and forwarding instance and assigning the first virtual private network label and the first transport label to the first traffic flow; and generating a second virtual private network label and a second transport label in the first virtual routing and forwarding instance and assigning the second virtual private network label and the second transport label to the second traffic flow.

12. The system of claim 11, wherein, when executed by one or more processors, the computer-executable instructions further cause the system to perform:

establishing, using multiprotocol border gateway protocol (MP-BGP), a label switched path to route the first traffic flow and the second traffic flow, based on the first virtual private network label and the first transport label assigned to the first traffic flow and the second virtual private network label and the second transport label assigned to the second traffic flow.

13. The system of claim 8, wherein, the first network slice profile comprises a first single network slice selection assistance information (S-NS-SAI) identifier assigned to the first network slice; and the second network slice profile comprises a second single network slice selection assistance information identifier assigned to the second network slice.

14. The system of claim 8, wherein, the first network slice profile comprises a first virtual data network name (VDNN) of the data network assigned to the first network slice; and the second network slice profile comprises a second virtual data network name of the data network assigned to the first network slice.

15. A system, comprising:

one or more processors; and a computer-readable storage media storing computer-executable instructions that, when executed by the one or more processors, cause the system to perform:

selecting a network slice from a plurality of network slices, the plurality of network slices pertaining to a common data network;

designating a traffic flow to the selected network slice, such that the traffic flow is specific to the selected network slice and wherein the traffic flow is configured to transport data packets between a UE associated with the network slice and a target workload of the data network;

generating a network slice profile for the selected network slice, the network slice profile including a network identifier that identifies the network slice and mapping information that correlates the selected network slice to the designated traffic flow, wherein the network slice profile comprises an IP pool identifier assigned to the network slice, an IP pool identifier identifying an IP pool of addresses, and a second network slice profile comprises the IP pool identifier assigned to the same IP pool of addresses;

receiving a data packet transmitted from a UE, the data packet including identification information of the UE;

determining, based on the identification information, whether the UE is associated with the selected network slice; and based on the determination that the UE is associated with the selected network slice, causing the data packet to be transported through the designated traffic flow on a single user plane function (UPF) instance.

16. The system of claim 15, further comprising:

generating, a virtual routing and forwarding instance, the virtual routing and forwarding instance including a virtual routing and forwarding identifier associated with the network slice profile;

routing the designated traffic flow, based on the virtual routing forwarding instance; and forwarding, the designated traffic flow to the target workload.

* * * * *